(12) United States Patent
McCrate et al.

(10) Patent No.: US 12,210,413 B2
(45) Date of Patent: Jan. 28, 2025

(54) DATA CORRECTION SCHEME WITH REDUCED DEVICE OVERHEAD

(71) Applicant: Micron Technology, Inc., Boise, ID (US)

(72) Inventors: Joseph M. McCrate, Boise, ID (US); Marco Sforzin, Cernusco sul Naviglio (IT); Paolo Amato, Treviglio (IT); Lingming Yang, Meridian, ID (US); Nevil N. Gajera, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 37 days.

(21) Appl. No.: 18/211,881

(22) Filed: Jun. 20, 2023

(65) Prior Publication Data

US 2024/0004756 A1    Jan. 4, 2024

Related U.S. Application Data

(60) Provisional application No. 63/357,266, filed on Jun. 30, 2022.

(51) Int. Cl.
*G06F 11/00* (2006.01)
*G06F 11/07* (2006.01)
*G06F 11/10* (2006.01)

(52) U.S. Cl.
CPC ...... *G06F 11/1068* (2013.01); *G06F 11/0772* (2013.01)

(58) Field of Classification Search
CPC .... G06F 11/1044; G06F 11/10; G06F 11/167; G06F 11/1048; G06F 11/1076; G06F 11/00; G06F 11/0751; G06F 11/0772
See application file for complete search history.

(56) References Cited

U.S. PATENT DOCUMENTS

| | | | | |
|---|---|---|---|---|
| 5,756,981 A * | 5/1998 | Roustaei | ............ | G06K 7/10732 235/462.07 |
| 6,906,999 B1* | 6/2005 | Schulz | ................ | H04L 49/1523 370/395.1 |
| 10,379,952 B2* | 8/2019 | Mateescu | ............ | H03M 13/373 |
| 10,459,793 B2* | 10/2019 | Bandic | ................ | G06F 11/1048 |
| 10,496,484 B2* | 12/2019 | Freikorn | ............... | G06F 11/167 |
| 10,977,125 B2* | 4/2021 | Mekhanik | .......... | H03M 13/1102 |
| 11,182,107 B2* | 11/2021 | De Roeck | ............. | G06F 3/0619 |

(Continued)

*Primary Examiner* — Esaw T Abraham
(74) *Attorney, Agent, or Firm* — Holland & Hart LLP

(57) ABSTRACT

Methods, systems, and devices for data correction schemes with reduced device overhead are described. A memory system may include a set of memory devices storing data and check codes associated with the data. The memory system may additionally include a single parity device storing parity information associated with the data. During a read operation of a set of data, a controller of the memory system may detect an error in data associated with a first check code, the data including two or more subsets of the set of data received from two or more corresponding memory devices. The controller may generate candidate data corresponding to one of the two or more subsets using the parity information and remaining subsets of the set of data. Then the controller may determine whether the candidate data is correct by comparing the first check code with a check value generated using the candidate data.

20 Claims, 9 Drawing Sheets

(56) References Cited

U.S. PATENT DOCUMENTS

| | | | | |
|---|---|---|---|---|
| 11,500,723 B2* | 11/2022 | Anderson | ......... | H03M 13/1515 |
| 11,581,906 B1* | 2/2023 | Berman | ................ | H03M 13/45 |
| 11,610,640 B1* | 3/2023 | Chiang | ................ | G11C 7/1084 |
| 11,860,733 B2* | 1/2024 | Sharon | ............... | H03M 13/1111 |

* cited by examiner

DATA CORRECTION SCHEME WITH REDUCED DEVICE OVERHEAD

CROSS REFERENCE

The present Application for Patent claims priority to U.S. Patent Application No. 63/357,266 by McCrate et al., entitled "DATA CORRECTION SCHEME WITH REDUCED DEVICE OVERHEAD," filed Jun. 30, 2022, which is assigned to the assignee hereof, and which is expressly incorporated by reference herein.

FIELD OF TECHNOLOGY

The following relates to one or more systems for memory, including data correction schemes with reduced device overhead.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

BRIEF DESCRIPTION OF THE DRAWINGS

FIGS. 5A through 5E illustrate examples of check code configurations that support a data correction scheme with reduced device overhead in accordance with examples as disclosed herein.

DETAILED DESCRIPTION

Figure 1:
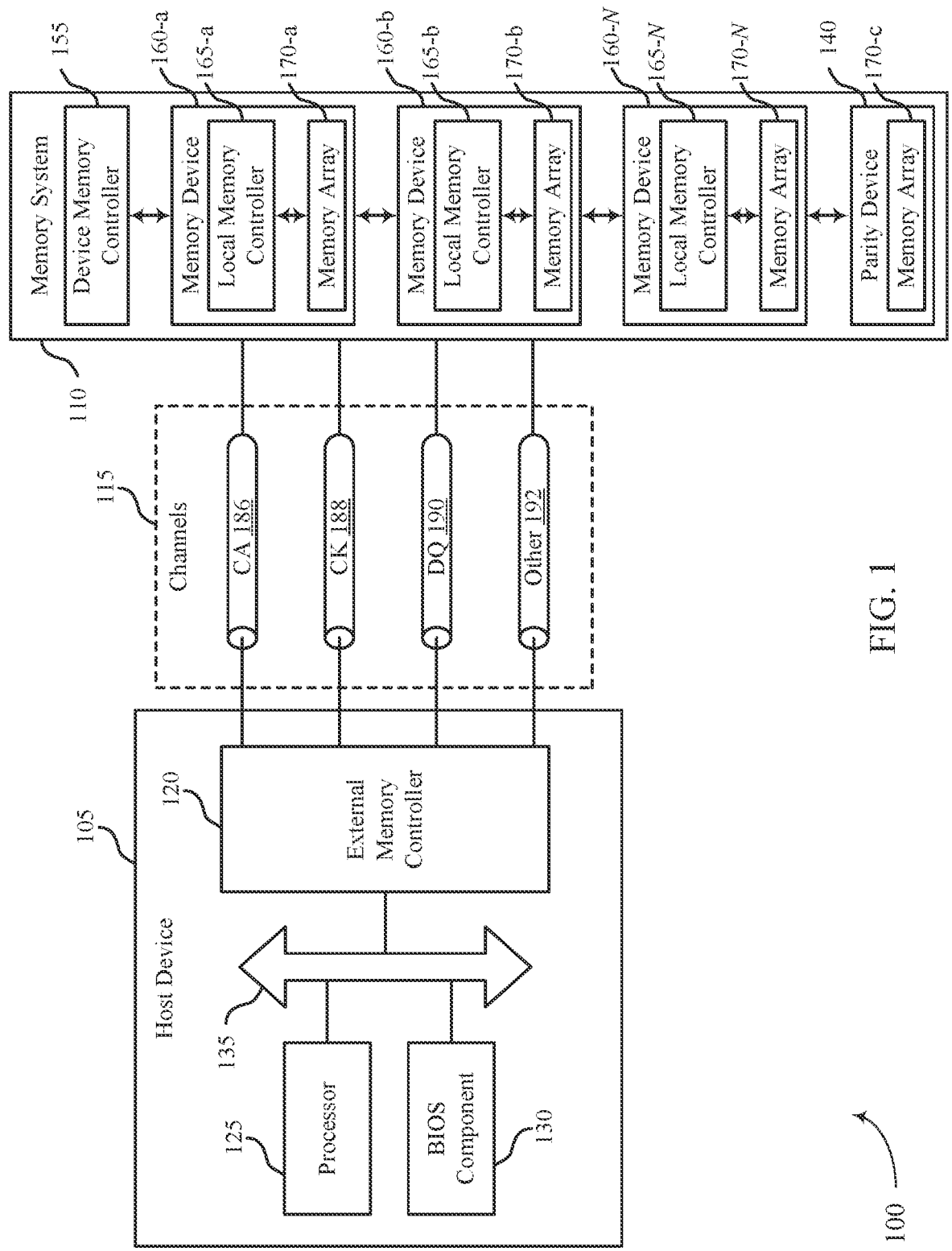
FIG. 1 illustrates an example of a system that supports a data correction scheme with reduced device overhead in accordance with examples as disclosed herein.

A memory system may include a set of memory devices (e.g., memory dies, memory arrays) that store data, which may include user data, metadata associated with the user data, check codes (e.g., cyclic redundancy check (CRC) codes) associated with the user data, and error correction codewords associated with the user data. The memory system may additionally include two or more parity devices (e.g., memory dies, memory arrays) that store parity information corresponding to the data stored by the set of memory devices. In one example, the memory system may include eight memory devices that store data and two parity devices that store parity information corresponding to the data. By including two or more parity devices storing parity information corresponding to the data stored by the set of memory devices, the memory system may detect and correct errors in the data associated with a single device failure. For example, in cases where one of the eight memory devices storing data becomes corrupted (e.g., the data stored by the one memory device includes errors that the memory system is unable to detect or correct using the check codes and error correction codewords stored on the memory device), the memory system may rely on the parity information stored by the two parity devices to correct the corrupted data.

In some cases, however, relying on two or more parity devices to store parity information may decrease a capacity of the memory system. That is, the memory system may be capable of storing less user data as compared to a memory system that relies on less than two parity devices. However, decreasing a quantity of parity devices at the memory system may, in some cases, also decrease a reliability of the memory system. For example, the memory system may be unable to correct errors corresponding in the data that are associated with a single device failure in cases that the memory system includes less than two parity devices.

Accordingly, the techniques as described herein provide for the memory system to include a single parity device storing parity information associated with data stored by a set of memory devices of the memory system. Additionally, the memory system may be capable of detecting and correcting errors associated with a single device failure using the parity information stored by the single parity device (e.g., single parity check (SPC) information). For example, the memory system may execute a read operation to read a set of data from the set of memory devices. In this example, the set of data may include at least user data and check codes associated with the user data, where each check code corresponds to user data stored by two or more memory devices. To execute the read operation, the memory system may receive the set of data from the set of memory devices and may additionally receive parity information associated with the set of data from the single parity device. The memory system may additionally generate check values based on the received user data and compare the generated check values with the check codes received from the memory devices.

In some cases, the memory system may detect an error (e.g., an error associated with a single device failure) based on a first generated check value being different than a corresponding first check code received from a memory system. Here, the memory system may detect an error associated with a portion of the set of data that is associated with the first check code, where the portion of the set of data includes two or more subsets of the set of data received from two or more memory devices. To correct the error, the memory system may generate, for one of the two or more subsets of data, candidate data using the parity information (e.g., received from the single parity device) and the remaining subsets of data (e.g., from the set of data received from the set of memory devices). Then, the memory system may generate another check value using the candidate data and the other subsets of data from the portion of the set of data and compare the generated check value with the first check code. In cases that the generated check value and the first check code are the same, the memory system may determine that the candidate data is correct. Additionally, in cases that the generated check value is different than the first check code, the memory system may generate candidate data for a different one of the two or more subsets of data. Thus, the memory system may iteratively generate and check candidate subsets of data to correct a single device failure using parity information from a single parity device.

Features of the disclosure are initially described in the context of a system as described with reference to FIG. 1. Features of the disclosure are described in the context of process flows, burst configurations, and check code configurations as described with reference to FIGS. 3 through 6E. These and other features of the disclosure are further illustrated by and described with reference to an apparatus diagram and flowcharts that relate to a data correction scheme with reduced device overhead as described with reference to FIGS. 7 through 9.

FIG. 1 illustrates an example of a system 100 that supports a data correction scheme with reduced device overhead in accordance with examples as disclosed herein. The system 100 may include a host device 105, a memory system 110, and a plurality of channels 115 coupling the host device 105 with the memory system 110. The system 100 may include one or more memory systems 110, but aspects of the one or more memory systems 110 may be described in the context of a single memory system (e.g., memory system 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory system 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or any combination thereof that implements the functions of an external memory controller 120. In some examples, the external memory controller 120 may be referred to as a host device (e.g., host device 105).

A memory system 110 may be an independent device or a component that is operable to provide physical memory addresses/space that may be used or referenced by the system 100. The memory system 110 may be referred to as a memory device or memory devices. In some examples, a memory system 110 may be configurable to work with one or more different types of host devices. Signaling between the host device 105 and the memory system 110 may be operable to support one or more of: modulation schemes to modulate the signals, various pin configurations for communicating the signals, various form factors for physical packaging of the host device 105 and the memory system 110, clock signaling and synchronization between the host device 105 and the memory system 110, timing conventions, or other functions.

The memory system 110 may be operable to store data for the components of the host device 105. In some examples, the memory system 110 (e.g., operating as a secondary-type device to the host device 105, operating as a dependent-type device to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

The memory system 110 may include a device memory controller 155 and one or more memory devices 160 (e.g., memory chips, memory dies) to support a capacity (e.g., a desired capacity, a specified capacity) for data storage. Each memory device 160 (e.g., memory device 160-*a*, memory device 160-*b*, memory device 160-N) may include a local memory controller 165 (e.g., local memory controller 165-*a*, local memory controller 165-*b*, local memory controller 165-N) and a memory array 170 (e.g., memory array 170-*a*, memory array 170-*b*, memory array 170-N). A memory array 170 may be a collection (e.g., one or more grids, one or more banks, one or more tiles, one or more sections) of memory cells, with each memory cell being operable to store one or more bits of data. Each memory cell may include a capacitive storage element (e.g., a dynamic RAM (DRAM) memory cell). A memory system 110 including two or more memory devices 160 may be referred to as a multi-die memory or a multi-die package or a multi-chip memory or a multi-chip package. Although described in the context of DRAM memory cells, a memory array 170 may include other types of memory cells such as static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory.

The device memory controller 155 may include components (e.g., circuitry, logic) operable to control operation of the memory system 110. The device memory controller 155 may include hardware, firmware, or instructions that enable the memory system 110 to perform various operations and may be operable to receive, transmit, or execute commands, data, or control information related to the components of the memory system 110. The device memory controller 155 may be operable to communicate with one or more of the external memory controller 120, the one or more memory devices 160, or the processor 125. In some examples, the device memory controller 155 may control operation of the memory system 110 described herein in conjunction with the local memory controller 165 of the memory device 160.

In some examples, the memory system 110 may communicate information (e.g., data, commands, or both) with the host device 105. For example, the memory system 110 may receive a write command indicating that the memory system 110 is to store data received from the host device 105, or receive a read command indicating that the memory system 110 is to provide data stored in a memory device 160 to the host device 105, among other types of information communication. In some cases, the memory system 110 may perform access operations (e.g., including write operations and read operations) according to a granularity such as a cache line granularity. That is, the device memory controller 155 may rely on a write cache for performing write operations and may rely on a read cache for performing read operations, where the write caches and read caches each store data according to the granularity. Additionally, or alternatively, the device memory controller 155 may rely on more than one cache (e.g., two caches, four caches, eight caches) to perform access operations at the memory devices 160 according to a larger granularity. For example, the device memory controller 155 may rely on four caches (e.g., four cache lines) to perform a write operation that writes a set of data (e.g., a memory transfer block (MTB)) to the memory devices 160 (e.g., via the four cache lines) during a single time interval.

A local memory controller 165 (e.g., local to a memory device 160) may include components (e.g., circuitry, logic) operable to control operation of the memory device 160. In some examples, a local memory controller 165 may be operable to communicate (e.g., receive or transmit data or commands or both) with the device memory controller 155. In some examples, a memory system 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or any combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory system 110). The external memory controller 120 may process (e.g., convert, translate) communications exchanged between the components of the host device 105 and the memory system 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory system 110, in some examples, the external memory controller 120, or its functions described herein, may be implemented by one or more components of a memory system 110 (e.g., a device memory controller 155, a local memory controller 165) or vice versa. Additionally, or alternatively, although the external memory controller 120 is depicted as being a part of the host device 105, in some examples the external memory controller 120 may be distinct from the host device 105. Here, the external memory controller 120 may be coupled with the memory device 110, the host device 105, or both.

The components of the host device 105 may exchange information with the memory system 110 using one or more channels 115. The channels 115 may be operable to support communications between the external memory controller 120 and the memory system 110. Each channel 115 may be an example of a transmission medium that carries information between the host device 105 and the memory system 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory system 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or any combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, clock signal channels 188 may be operable to communicate one or more clock signals between the host device 105 and the memory system 110. Clock signals may be operable to oscillate between a high state and a low state, and may support coordination (e.g., in time) between actions of the host device 105 and the memory system 110. In some examples, the clock signal may be single ended. In some examples, the clock signal may provide a timing reference for command and addressing operations for the memory system 110, or other system-wide operations for the memory system 110. A clock signal may be referred to as a control clock signal, a command clock signal, or a system clock signal. A system clock signal may be generated by a system clock, which may include one or more hardware components (e.g., oscillators, crystals, logic gates, transistors).

A memory system 110 may include a set of memory devices 160 that store user data received from the host device 105. For example, the host device 105 may transmit a write command to the memory system 110 (e.g., via the one or more CA channels 186) indicating for the memory system 110 to write the user data to the memory devices 160 of the memory system 110. Additionally, the memory system 110 may write metadata (e.g., that is associated with the user data) to the memory devices 160.

In some cases, the device memory controller 155 may execute error correcting code (ECC) schemes (e.g., based on check codes, error correction codewords, parity information, or a combination thereof) to increase a reliability of the data stored at the memory system 110. That is, by using one or more ECC schemes, the memory system 100 may decrease an annualized fail rate (AFR) or a silent data corruption (SDC) rate associated with data stored at the memory system. For example, the device memory controller 155 may perform one or more error control operations to generate error correction codewords (e.g., single error correction (SEC) codewords, double error correction (DEC) codewords) associated with the user data. Here, the device memory controller 155 may additionally write, to each of the memory devices 160, one or more error correction codewords associated with the user data stored at the corresponding memory device 160. Additionally, or alternatively, the device memory controller 155 may compute check codes (e.g., CRC codes) associated with the user data prior to writing the user data to one or more memory devices 160. In some cases, the device memory controller 155 may compute check codes for the data associated with each cache line. That is, in an example where the device memory controller 155 performs a write operation using four cache lines, the device memory controller 155 may calculate a check code for the user data associated with each cache line (e.g., four check codes for a data burst or MTB). Here, the device memory controller 155 may additionally write the check codes to the memory devices 160.

In some cases (e.g., to increase the reliability of the memory system 110 using an ECC scheme), the memory system 110 may additionally include two or more parity devices 140 that store parity information corresponding to the data stored by the memory devices 160. For example, the memory system 110 may include eight memory devices 160 that store data (e.g., associated with a single data burst or MTB) and two parity devices 140 that store parity information corresponding to the data. Each parity device 140 may include a memory array 170-*c*.

By including two or more parity devices 140 storing parity information corresponding to the data stored by the memory devices 160, the memory system 110 may be capable of correcting errors in the data associated with a single memory device 160 failure (e.g., the memory system 110 may be capable of implementing a chipkill scheme). For example, in cases that one of the memory devices 160 storing data becomes corrupted (e.g., the data stored by the one memory device 160 includes errors that the memory system 110 is unable to detect or correct using the check codes and error correction codewords stored on the memory device 160), the memory system 110 may rely on the parity information stored by the two parity devices 140 (e.g., in combination with the error correction codewords and check codes) to correct the corrupted data.

In some cases, however, relying on two or more parity devices 140 to store parity information may decrease a capacity of the memory system 110. That is, the memory system 110 may be capable of storing less user data as compared to a memory system 110 that instead relies on less than two parity devices 140 to store parity information. However, decreasing a quantity of parity devices 140 at the memory system 110 may, in some cases, also decrease a reliability of the memory system 110. For example, the memory system 110 may be unable to correct errors in the data that are associated with a single memory device failure in cases where the memory system 110 includes less than two parity devices. In another example, the memory system 110 may be unable to correct errors in the data that are associated with a single access failure. Here, the memory system 110 may be unable to correct errors in cases where the data received from a memory device 160 during an access operation (e.g., a pre-fetch operation, a read access operation) is corrupted even in cases when remaining portions of data stored in the memory device 160 are valid (e.g., in a case of a single row failure at the memory device 160).

Accordingly, in the example of the memory system 110, the memory system 110 may include a single parity device 140 storing parity information associated with data stored by the memory devices 160. Additionally, the memory system 110 may be capable of detecting and correcting errors associated with a single memory device 160 failure using the parity information stored by the single parity device 140. For example, the memory system 110 may execute a read operation to read a set of data from the memory devices 160. In this example, the set of data may include at least user data and check codes associated with the user data, where each check code corresponds to the data stored by two or more memory devices 160. To execute the read operation, the memory system 110 may receive the set of data from the memory devices 160 and may additionally receive parity information associated with the set of data from the single parity device 140. The memory system 110 may additionally generate check values based on the received user data and compare the generated check values with the check codes received from the memory devices 160.

In some cases, the memory system 110 may detect an error (e.g., an error associated with a single memory device 160 failure) based on a first generated check value being different than a corresponding first check code received from a memory system 110. Here, the memory system 110 may detect an error associated with a portion of the set of data that is associated with the first check code, where the portion of the set of data includes two or more subsets of the set of data received from two or more memory devices 160. To correct the error, the memory system 110 may generate, for one of the two or more subsets of data, candidate data using the parity information (e.g., received from the single parity device 140) and the remaining subsets of data (e.g., from the set of data received from the set of memory devices 160). Then, the memory system 110 may generate another check value using the candidate data and the other subsets of data from the portion of the set of data and compare the generated check value with the first check code. In cases that the generated check value and the first check code are the same, the memory system 110 may determine that the candidate data is correct. Additionally, in cases that the generated check value is different than the first check code, the memory system 110 may generate candidate data for a different one of the two or more subsets of data. Thus, the memory system 110 may iteratively generate and check candidate subsets of data to correct a single memory device failure using parity information from a single parity device 140.

In some instances, reducing a quantity of the parity devices 140 at the memory system 110 may increase a storage capacity of the memory system 110. For example, in an example where the memory system 110 relies on two parity devices 140 to store parity information associated with data stored by a set of eight memory devices 160, the memory system 110 may include a 25% parity information overhead. Additionally, in an example where the memory system 110 instead relies on a single parity device 140 to store parity information associated with data stored by a set of eight memory devices 160, the memory system 110 may include a 12.5% parity information overhead. In these examples, reducing the quantity of the parity devices 140 at the memory system 110 may increase the storage capacity of the memory system 110 by approximately 10%.

Figure 2:
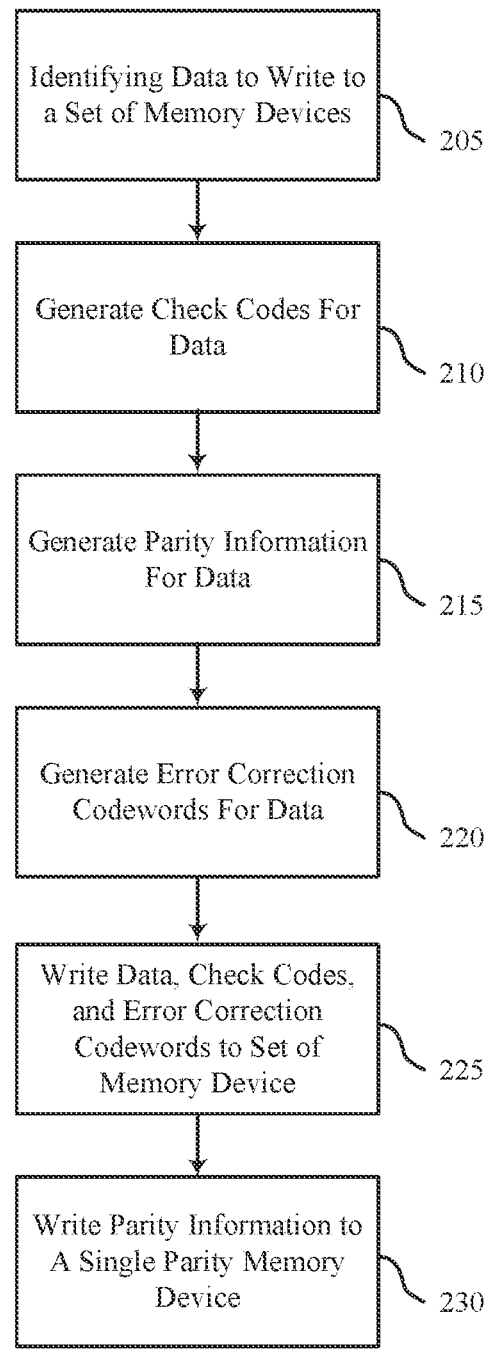
FIGS. 2 and 3 illustrate examples of process flows that support a data correction scheme with reduced device overhead in accordance with examples as disclosed herein.

FIG. 2 illustrates an example of a process flow 200 that supports a data correction scheme with reduced device overhead in accordance with examples as disclosed herein. The process flow 200 may be performed by aspects of the system as described with reference to FIG. 1. For example, a memory system may implement the process flow 200 as part of a write operation as described with reference to FIG. 1. In some cases, the memory system may implement the process flow 200 in cases that the memory system is capable of correcting single device failures (e.g., including single access failures) and relies on a single parity device to store parity information associated with a set of data.

At 205, the memory system may identify a set of data to write to a set of memory devices (e.g., the memory devices 160 as described with reference to FIG. 1). For example, the memory system may receive a write command from a host device indicating the set of data to write to the set of memory devices. In some cases, the write command may indicate a portion of the data (e.g., corresponding to user data) to write to the set of memory devices. For example, the set of data may additionally include metadata associated with the user data. Here, the memory system may generate the metadata associated with the user data. Additionally, or alternatively, the host device may indicate the user data and metadata for the memory system to write to the set of memory devices.

Additionally, the memory system may identify subsets of the data, where each subset of the data corresponds to one of the set of memory devices. For example, the data may include eight subsets of data, where each subset of data is written to a corresponding one of a set of eight memory devices at the memory system.

At 210, the memory system may generate check codes for the set of data. In some cases, the check codes may correspond to CRC codewords or CRC checksums. In one case, the memory system may generate a single check code for the set of data. Here, the generated check code may correspond to each of the subsets of data. In other cases, the memory system may generate a check code for each subset of data. For example, in a case that the set of data includes eight subsets of data (e.g., to be written to eight corresponding memory devices), the memory system may generate eight check codes, each associated with one of the eight subsets of data. In other cases, the memory system may generate more than one check code for the set of data, but less check codes than a total quantity of subsets of data. Here, one or more of the check codes may correspond to more than one subset of data (e.g., may correspond to data stored in more than one memory device). For example, the memory system may generate a check code corresponding to the data associated with each cache line. Here, in a case that the memory system includes four cache lines and identifies data including eight subsets of data to be stored in eight corresponding memory devices, the memory system may generate four check codes each corresponding to two subsets of data.

At 215, the memory system may generate parity information for the set of data. In some cases, the memory system may generate the parity information by performing exclusive or (XOR) operations on one bit of each subset of data. Here, each bit of the parity information may correspond to a parity of one bit from each subset of data. In some cases, the parity information may correspond to SPC information.

At 220, the memory system may generate error correction codewords corresponding to each of the subsets of data. That is, the memory system may perform an error control operation to generate an error correction codeword for each of the subsets of data. In one example, the memory system may perform an SEC operation to generate SEC codewords associated with each of the subsets of data. In another example, the memory system may perform DEC operations to generate DEC codewords associated with each of the subsets of data. In an example where the set of data includes eight subsets of data, the memory system may generate eight codewords at 220 (e.g., by performing eight error control operations on each of the subsets of data).

At 225, the memory system may write the set of data, the check codes, and the error correction codewords to the set of memory devices. For example, the set of data, the check codes, and the error correction codewords may be part of a data burst (e.g., an MTB), and the memory system may write the set of data, the check codes, and the error correction codewords to the set of memory devices during a single time interval.

At 230, the memory system may write the parity information (e.g., the SPC information) to a single parity memory device. In some cases, the parity information may be a part of the data burst (e.g., the MTB). Here, the memory system may write the parity information to the single parity memory device during the single time interval.

Figure 3:
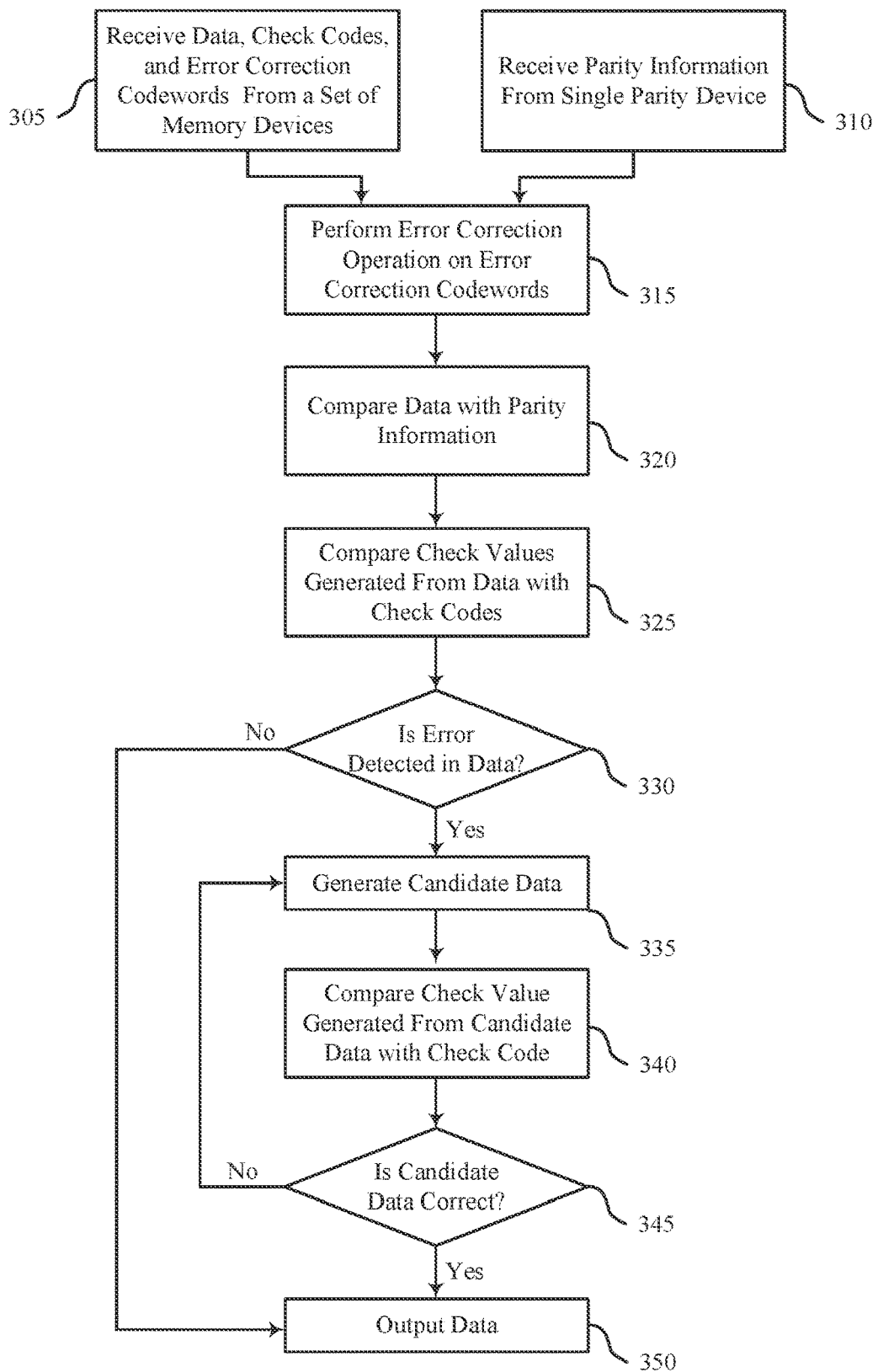

FIG. 3 illustrates an example of a process flow 300 that supports a data correction scheme with reduced device overhead in accordance with examples as disclosed herein. The process flow 300 may be performed by aspects of the system as described with reference to FIG. 1. For example, a memory system may implement the process flow 300 as part of a read operation as described with reference to FIG. 1. In some cases, the memory system may implement the process flow 300 in cases that the memory system is capable of correcting single device failures (e.g., including single access failures) and relies on a single parity device to store parity information associated with a set of data. Additionally, a memory system may implement the process flow 300 to read data stored in a set of memory devices as part of the process flow 200.

At 305, the memory system may receive a set of data, one or more check codes, and error correction codewords from a set of memory devices. For example, the memory system may perform a read operation to retrieve the set of data (e.g., a data burst, an MTB) stored on the set of memory devices. The set of data may include subsets of data, where each subset of data corresponds to data received from one of the set of memory devices. That is, in an example where the set of memory devices includes eight memory devices, the set of data may include eight subsets of data each retrieved from one of the eight memory devices in the set. Each subset of data may include a subset of user data, an error correction codeword associated with the user data, and at least a portion of a check code. In some cases, the memory system may receive the set of data over a set of clock cycles (e.g., a time interval) as part of a single read operation.

At 310, the memory system may receive parity information from a single parity device. That is, the memory system may retrieve the parity information from the single parity device as part of the same read operation associated with receiving the set of data, check codes, and error correction codewords at 305. Here, the memory system may receive the parity information from the single parity device over the same set of clock cycles as receiving the set of data, check codes, and error correction codewords from the set of memory devices. In some cases, the parity information may correspond to SPC information that is generated by performing an XOR operation on the set of data (e.g., stored on the set of memory devices).

At 315, the memory system may perform error correction operations to correct errors in the received set of data. That is, the memory system may perform an error correction operation on each of the error correction codewords to correct errors in a corresponding one of the subsets of data. In one example where the error correction codewords are SEC codewords, the memory system may perform an SEC operation on each of the codewords to correct single-bit errors in the received subsets of data. In another example where the error correction codewords are DEC codewords, the memory system may perform DEC to correct single-bit and double-bit errors in the received subsets of data. In an example where the set of data includes eight subsets of data, at 315 the memory system may perform eight error correction operations on each of the eight error correction codewords corresponding to one of the eight subsets of data. Additionally, or alternatively, the memory system may perform one or more error detection operations to detect (e.g., and not correct) errors in the set of data using the error correction codewords. In some cases, the memory system may be unable to correct some types of errors in the received set of data. For example, the memory system may be unable to rely on error correction codewords to detect and correct errors associated with single device failure. Additionally, or alternatively, the memory system may be unable to detect and correct errors associated with more than a threshold quantity of bits (e.g., associated with more than two, three, or four bits). Thus, after executing the error correction operations at 315, the received set of data may still include errors that are undetected or uncorrected.

At 320, the memory system may compare the set of data received from the set of memory devices with the parity information received from the single parity device. That is, each bit of the parity information may correspond to a parity of one bit from each subset of data. Here, the memory system may compare, for each clock cycle within the time interval, a bit of the parity information received from the single parity information on that clock cycle with portion of the set of data received during that clock cycle. For example, the memory system may perform an XOR operation on the portion of the set of data received during each clock cycle and compare a result with the parity information received during the corresponding clock cycle.

For example, during a first clock cycle, the memory system may receive a first bit of the parity information and one bit of data from each of the memory devices (e.g., one bit of each of the subsets of data). Here, the memory system may perform an XOR operation on each bit of data received during the first clock cycle and compare a result with the first bit of parity information. In cases that the result of the XOR operation is the same as the first bit of parity information, the memory system may not detect an error associated with a portion of the set of data corresponding to each bit of data received during the first clock cycle. Additionally, in cases that the result of the XOR operation is different than the first bit of parity information, the memory system may detect an error associated with the portion of the set of data corresponding to each bit of data received during the first clock cycle. The memory system may perform similar comparisons for each remaining clock cycle in the set.

At 325, the memory system may compare check values generated from the set of data with the one or more check codes corresponding to the set of data. That is, each of the one or more check codes may correspond to CRC checksums or CRC codes received from the set of memory devices that correspond to one or more of the subsets of data. In one case, the memory system may receive a single check code from the set of memory devices at 305 that is associated with the set of data (e.g., a single check code associated with each subset of data). In another case, the memory system may receive a set of check codes each corresponding to one of the subsets of data. For example, in a case that the set of data includes eight subsets of data (e.g., to be written to eight corresponding memory devices), the memory system receives eight check codes, each associated with one of the eight subsets of data. In other cases, the memory system may receive more than one check code, but less check codes than a total quantity of subsets of data. Here, one or more of the check codes may correspond to more than one subset of data.

For each of the one or more check codes, the memory system may compute a check value based on the one or more subsets of data associated with that check code. In cases that the computed check value is different than the corresponding check code received from the set of memory devices at 305, the memory system may detect an error in the one or more subsets of data associated with that check code. Additionally, in cases that the computed check value matches the corresponding check code received from the set of memory devices at 305, the memory system may not detect an error in the one or more subsets of data associated with that check code.

At 330, the memory system may determine whether an error is detected in at least one subset of the set of data. In cases that memory system fails to detect one or more errors in the set of data at 315, 320, or 325, the memory system may determine that no errors are detected in the set of data and may accordingly proceed to 350.

Additionally, in cases that the memory system detects one or more errors in the set of data at 320 or 325 (and in cases that the memory system detects and does not correct errors at 315), the memory system may determine that errors are detected in at least one subset of the set of data and proceed to 335. That is, at 330 the memory system may determine that one of the subsets of data includes errors. For example, the memory system may determine that a check value computed at 325 is different than the corresponding check code. Thus, the memory system may determine that the one or more subsets of data corresponding to the computed check value that is different than the corresponding check code.

In an example of a single device or single access failure, the memory system may detect errors associated with the portions of the set of data received in each of the clock cycles at 320 based on detecting differences between a parity of each of the portions of the set of data and the parity indicated by the parity information. Additionally, the memory system may determine that the computed check value associated with one or more subsets of data including a subset of data received from the memory device associated with the single device or single access failure is different than the corresponding check code.

In cases that the memory system detects an error in the data, the memory system may proceed to perform the operations at 335, 340, and 345 to attempt to identify and correct the detected errors. That is, the memory system may detect an error associated with one or more subsets of data that correspond to a check value (e.g., computed at 325) that is different than the check code corresponding to the one or more subsets of data. However, in cases that the computed check value that is different than the check code corresponds to more than one subset of data, the memory system may perform the operations at 335, 340, and 345 to identify (and attempt to correct) one of the subsets of data (e.g., from the more than one subset of data corresponding to the computed check value that is different than the corresponding check code) that includes the detected error.

At 335, the memory system may generate candidate data corresponding to one of the subsets of data that corresponds to a check value (e.g., computed at 325) that is different than the corresponding check code. The memory system may generate the candidate data corresponding to one of the subsets of data by performing an XOR operation on each of the remaining subsets of data (e.g., other than the subset of data corresponding to the candidate data) and the parity information. That is, the memory system may perform a bitwise XOR operation on each of the remaining subsets of data and the parity information to generate the candidate data. Here, the candidate data may indicate a parity of the parity information and remaining subsets of data.

At 340, the memory system may compare a check value generated from the candidate data with the check code corresponding to subset of data that the candidate data corresponds to. That is, the memory system may compute a check value (e.g., a CRC checksum, a CRC code) from the candidate data and any other subsets of data that are associated with the check code. In an example where each subset of data is associated with a single check code (e.g., the memory system retrieves a same quantity of check codes and subsets of data at 305), the memory system may compute the check value from the candidate data without any other subsets of data. Additionally, in an example where the subset of data to which the candidate data corresponds is associated with a check code that corresponds to more than one subset of data, the memory system may compute the check value from the candidate data and one or more additional subsets of data (e.g., that correspond to a same check code).

At 345, the memory system may determine whether the candidate data is correct. For example, in cases that the check value computed from the candidate data matches the corresponding check code received from the set of memory devices at 305, the memory system may determine that the candidate data is correct. Here, the memory system may proceed to 350.

Additionally, in cases that the check value computed from the candidate data is different than the corresponding check code received from the set of memory devices at 305, the memory system may determine that the candidate data is not correct. In cases that the candidate data corresponds to a check code that in turn corresponds to more than one subset of data, the memory system may proceed to 335 to generate candidate data for another one of the more than one subset of data corresponding to the same check code. Here, the memory system may serially generate candidate data for each of the more than one subsets of data corresponding to the same check code until the memory system determines that the candidate data is correct at 345. In some other examples, the memory system may generate candidate data for each of the more than one subsets of data corresponding to the same check code in parallel (e.g., during overlapping time intervals).

In cases that the memory system generates candidate data for each of the subsets of data associated with the same check code and fails to determine that any of the generated candidate data is correct (e.g., at 345), the memory system may exit the process flow 300 and may transmit signaling to the host device indicating an uncorrectable error (e.g., signaling indicating that the set of data is poisoned). Additionally, in cases that the memory system generates more than one set of candidate data that the memory system determines is correct at 345, the memory system may exit the process flow 300 and may transmit signaling to the host device indicating an uncorrectable error (e.g., signaling indicating that the set of data is poisoned).

At 350, the memory system may output the set of data. For example, the memory system may transmit a signal to the host device indicating the set of data. In cases that the memory system does not detect an error in the set of data at 330, the memory system may output the set of data received from the set of memory devices at 305. Additionally, or alternatively, in cases that the memory system does detect an error in the set of data at 330, the memory system may output the set of data including the candidate data (e.g., determined to be correct at 345) to the host device at 350.

Figure 4:
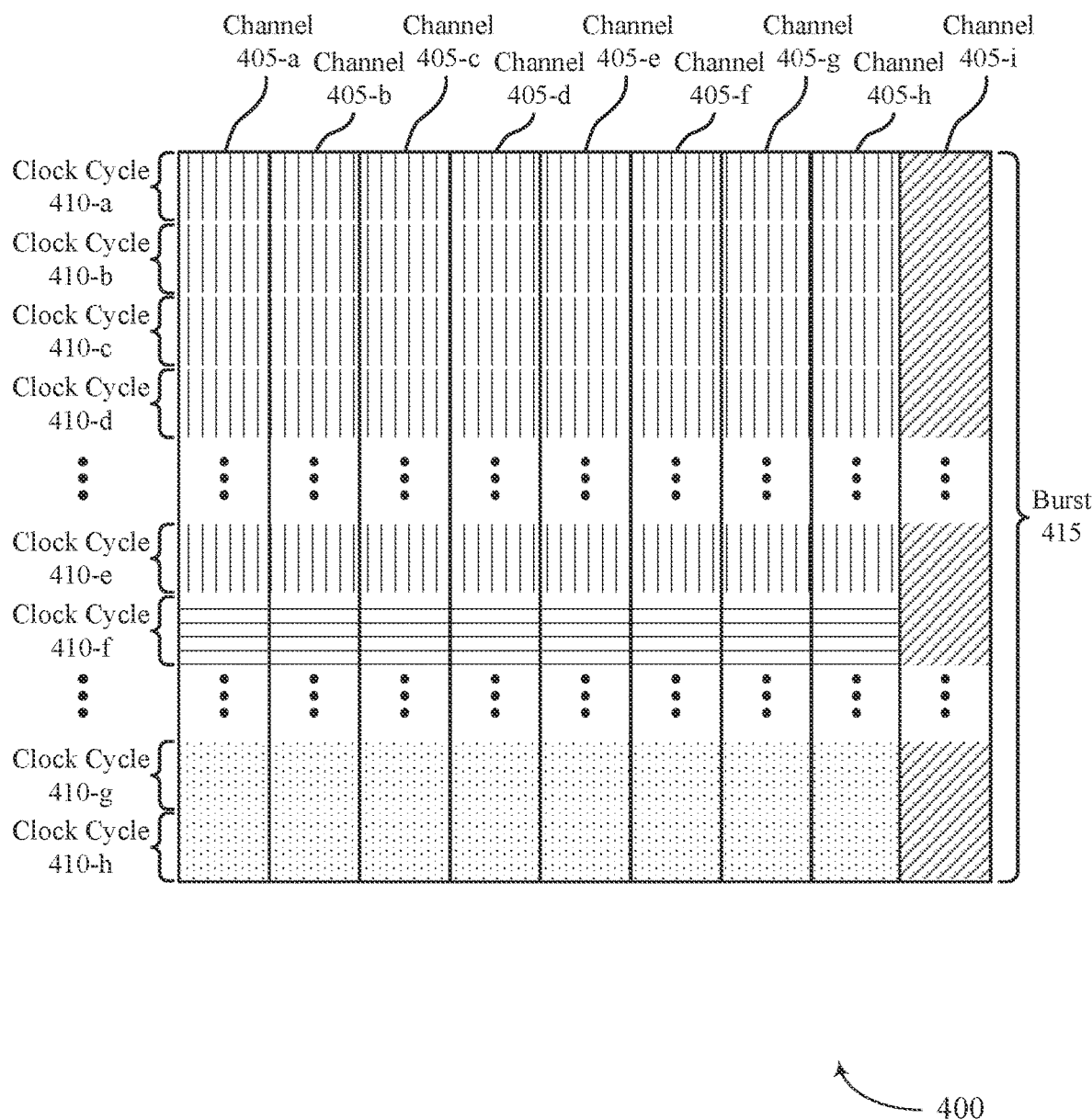
FIG. 4 illustrates an example of a burst configuration that supports a data correction scheme with reduced device overhead in accordance with examples as disclosed herein.

FIG. 4 illustrates an example of a burst configuration 400 that supports a data correction scheme with reduced device overhead in accordance with examples as disclosed herein. In some cases, a memory system as described with reference to FIGS. 1 through 3 may rely on the burst configuration 400. For example, a memory system that implements the process flow 200 (e.g., to write a set of data to a set of memory devices) may rely on the burst configuration 400 to subsequently read the set of data. Additionally, a memory system that implements the process flow 300 to read a set of data from a set of memory devices may receive the set of data from the set of memory devices according to the burst configuration 400.

The burst configuration 400 may illustrate configuration of a burst 415 of information received by a controller of a memory system (e.g., a device memory controller) from a set of memory devices. The burst 415 may include a set of data 420, check codes 430, parity information 425, and error correction codewords 435. Additionally, the burst 415 may be received by the memory system (e.g., from a set of memory devices) via a set of channels 405 and over a set of clock cycles 410. In some cases, each of the channels 405 may transfer signaling between a memory device or parity device and a controller associated with the memory system. For example, the channels 405-a, 405-b, 405-c, 405-d, 405-e, 405-f, 405-g, and 405-h may each correspond to one of a set of memory devices that store user data (e.g., data 420), check codes 430, and error correction codewords 435. Additionally, or alternatively, the channel 405-i may correspond to a memory device that stores parity information 425 (e.g., a parity device).

The memory system may receive the burst 415 as part of a single access operation. That is, the burst 415 may correspond to an MTB. In the example of the burst configuration 400, the burst 415 may include 32 sets of nine bits (e.g., each received via one of the channels 405), where each of the 32 sets of nine bits is received during one of the clock cycles 410. For example, during the clock cycle 410-a, the memory system may receive eight bits of the data 420 (e.g., via the channels 405-a through 405-h) and one bit of parity information 425 (e.g., via the channel 405-i).

The parity information 425 may correspond to SPC information. Additionally, or alternatively, each bit of parity information 425 received during a clock cycle 410 may indicate a parity of the eight bits of information (e.g., data 420, check codes 430, error correction codewords 435) received during the same clock cycle. For example, the one bit of parity information 425 received during the clock cycle 410-b may indicate a parity of the eight bits of data 420 received during the clock cycle 410-b. Similarly, the one bit of parity information 425 received during clock cycles 410-c, 410-d, 410-e, 410-f, 410-g, and 410-h may indicate a parity of the eight bits of data 420 received during the corresponding clock cycle 410. In some cases, for each of the clock cycles 410, the memory system may perform an XOR operation on the eight bits of information (e.g., data 420, check codes 430, error correction codewords 435) received during each clock cycle 410 and compare a result of the XOR operation with the one bit of parity information 425 received during the corresponding clock cycle 410. In cases that the result of the XOR operation on the eight bits of information received during a clock cycle 410 is the same as the one bit of parity information 425 received during that clock cycle 410, the memory system may not detect an error associated with the eight bits of information received during that clock cycle 410. Additionally, in cases that the result of the XOR operation on the eight bits of information received during a clock cycle 410 is different than the one bit of parity information 425 received during that clock cycle 410, the memory system may detect an error associated with the eight bits of information received during the clock cycle 410.

In some cases, the set of data 420 within the burst 415 may include multiple subsets of the data 420 each received via one of the channels 405-a (e.g., from a corresponding memory device). For example, the data 420 received via the channel 405-b may correspond to one subset of data 420 and the data 420 received via the channel 405-c may correspond to another subset of data 420. Additionally, the check codes 430 may each correspond to one or more of the subsets of data 420. For example, the check codes 430 may include a single check code 430 associated with each subset of the data 420 (e.g., the data 420 received via each of the channels 405). In another example, the check codes 430 may include a different check code 430 for each of the subsets of data 420. In other examples, the check codes 430 may include check codes 430 for more than one subset of the data 420, but for less than all of the subsets of the data 420. That is, the check codes 430 may include check codes 430 that correspond to two subsets of the data 420, three subsets of the data 420, four subsets of the data 420, five subsets of the data 420, six subsets of the data 420, seven subsets of the data 420, or any combination thereof.

The burst 415 may additionally include error correction codewords 435 (e.g., that include redundancy information that is distinct from the parity information 425 received via that channel 405-i). In some cases, the error correction codewords 435 may correspond to the data 420 received via the same channel 405. For example, the error correction codewords 435 received via the channel 405-a may correspond to the data 420 received via the channel 405-a. The burst 415 may include metadata (e.g., data associated with user data, data associated with the data 420). In some cases, the burst 415 may include the metadata with the check codes 430. Additionally, or alternatively, the burst 415 may include the metadata with the set of data 420.

FIGs. 5A through 5E illustrate examples of check code configurations 500 that support a data correction scheme with reduced device overhead in accordance with examples as disclosed herein. In some cases, a memory system as described with reference to FIGS. 1 through 4 may rely on one or more of the check code configurations 500. For example, a memory system may implement the process flows 200 or 300 using one of the check code configurations 500. Additionally, the memory system may receive a burst (e.g., as indicated by the burst configuration 400) that includes one of the check code configurations 500.

Each of the check code configurations 500 may include data 520 and error correction codewords 535 (e.g., error correction codewords 535-a, 535-b, 535-c, 535-d, and 535-e), which may be an example of the data 420 and the error correction codewords 435, respectively, as described with reference to FIG. 4. Here, the data 520 may include multiple data subsets, where each data subset corresponds to data stored by a different memory device. Additionally, each of the data subsets may be associated with an error correction codeword 535 (e.g., an ECC) that corresponds to a same memory device and includes error correction information corresponding to the associated data subset.

Each of the check code configurations 500 may additionally include one or more check codes 530 corresponding to one or more of the data subsets. The various check code configurations 500 illustrate example correspondences between subsets of the data 520 and one or more check codes 530.

Figure 5A:
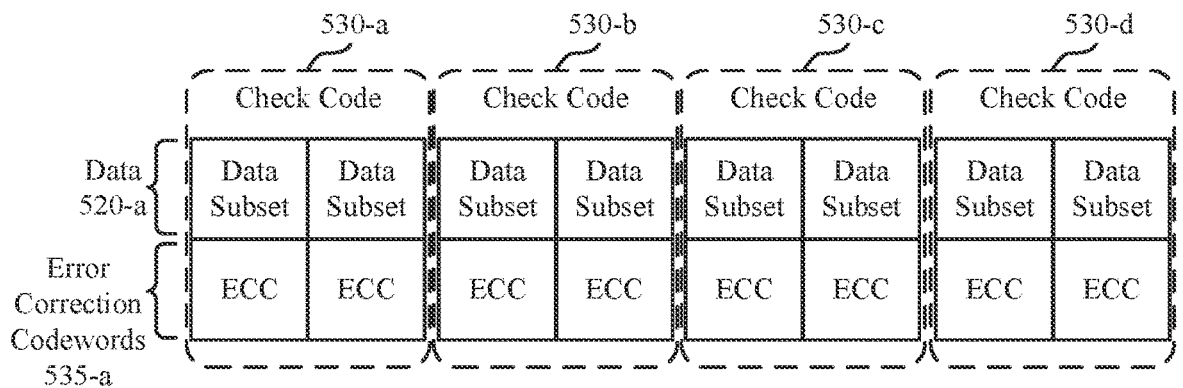

FIG. 5A illustrates an example check code configuration 500-a, where each of the check codes 530 corresponds to two subsets of the data 520-a. In some cases, each of the check codes 530 may correspond to subsets of the data 520-a that are associated with a single cache line. For example, the check code 530-a may correspond to two subsets of the data 520-a associated with a first cache line of the memory system, the check code 530-b may correspond to two subsets of the data 520-a associated with a second cache line of the memory system, the check code 530-c may correspond to two subsets of the data 520-a associated with a third cache line of the memory system, and the check code 530-d may correspond to two subsets of the data 520-a associated with a fourth cache line of the memory system.

In some cases, a memory system may detect an error associated with the subsets of data 520-a corresponding to one of the check codes 530 in the check code configuration 500-*a*. For example, the memory system may compute a check value associated with the subsets of the data 520-*a* corresponding with each check code 530 and compare the computed check values with the corresponding check codes 530. In cases that the computed check value is different than the corresponding check code 530, the memory system may detect an error in one of the two subsets of the data 520-*a* corresponding to the check code 530. For example, if the memory system computes a check value from the data subsets corresponding to the check code 530-*b* that is different than the check code 530-*b*, the memory system may detect an error in the two subsets of data 520-*a* corresponding to the check code 530-*b*. In some cases, to identify and correct errors in one of the subsets of the data 520-*a*, the memory system may generate up to two different sets of candidate data (e.g., corresponding to each of the two subsets of the data 520-*a* associated with the check code 530 that is different than the computed check value).

Figure 5B:
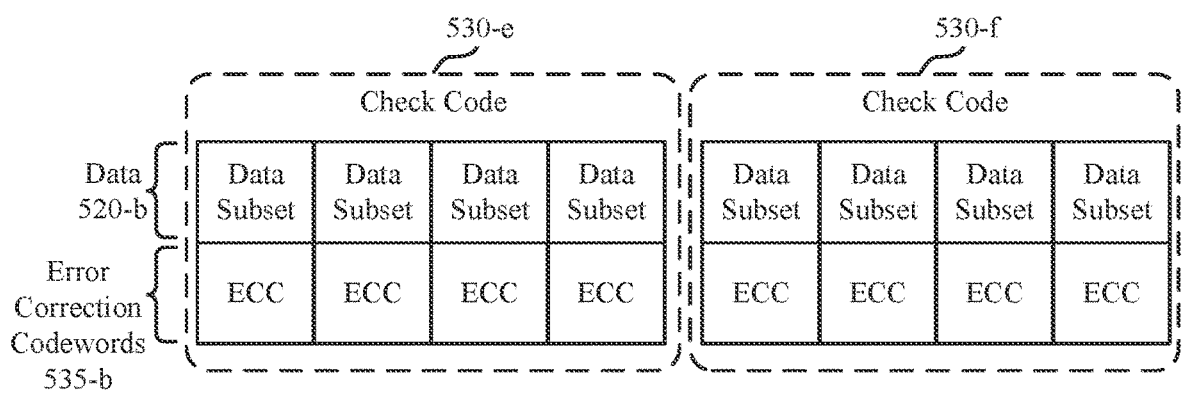

FIG. 5B illustrates an example check code configuration 500-*b*, where each of the check codes 530 corresponds to two subsets of the data 520-*b*. In some cases, a memory system may detect an error associated with the subsets of data 520-*b* corresponding to one of the check codes 530 in the check code configuration 500-*b*. For example, the memory system may compute two check values (e.g., from the subsets of the data 520-*b* corresponding to each check code 530) and compare the computed check values with the corresponding check codes 530 (e.g., check code 530-*e*, check code 530-*f*). In cases that the computed check value is different than the corresponding check code 530, the memory system may detect an error in one of the four subsets of the data 520-*b* corresponding to the check code 530. For example, if the memory system computes a check value from the data subsets corresponding to the check code 530-*e* that is different than the check code 530-*e*, the memory system may detect an error in the four subsets of data corresponding to the check code 530-*e*. In some cases, to identify and correct errors in one of the subsets of the data 520-*b*, the memory system may generate up to four different sets of candidate data (e.g., corresponding to each of the four subsets of the data 520-*b* associated with the check code 530 that is different than the computed check value).

Figure 5C:
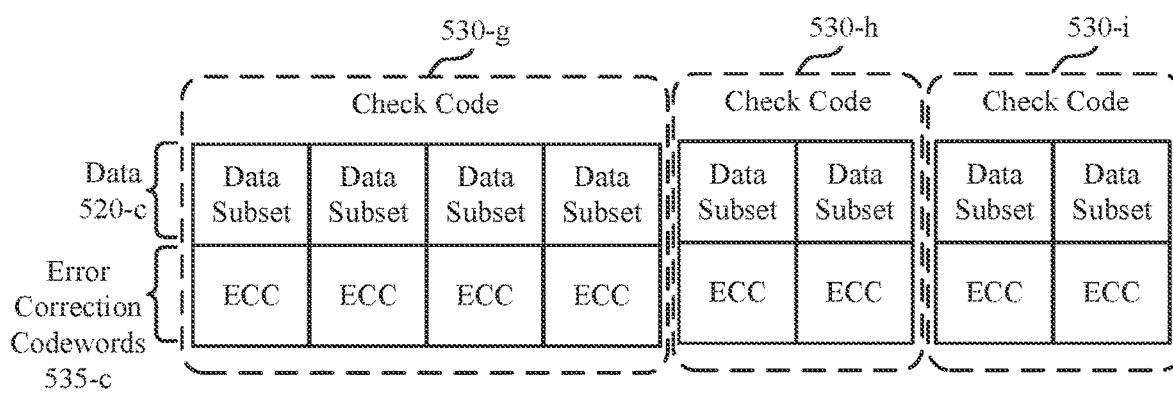

FIG. 5C illustrates an example check code configuration 500-*c*, where one of the check codes 530-*g* corresponds to four subsets of the data 520-*c* and two check codes 530-*h* and 530-*i* corresponding to two subsets of the data 520-*c*. In some cases, a memory system may detect an error associated with the subsets of data 520-*c* corresponding to one of the check codes 530 in the check code configuration 500-*c*. For example, the memory system may compute three check values (e.g., from the subsets of the data 520-*c* corresponding to each check code 530) and compare the computed check values with the corresponding check codes 530. In cases that the computed check value is different than the corresponding check code 530, the memory system may detect an error in one of the subsets of the data 520-*c* corresponding to the check code 530. For example, if the memory system computes a check value from the data subsets corresponding to the check code 530-*h* that is different than the check code 530-*h*, the memory system may detect an error in the two subsets of the data 520-*c* corresponding to the check code 530-*h*. In some cases, to identify and correct errors in one of the subsets of the data 520-*c*, the memory system may generate up to four different sets of candidate data (e.g., corresponding to each of the four subsets of the data 520-*c* associated with the check code 530 that is different than the computed check value). That is, in cases that the memory system detects an error in the subsets of the data 520-*c* corresponding to the check code 530-*g*, the memory system may generate up to four different sets of candidate data. Additionally, in cases that the memory system detects an error in the subsets of the data 520-*c* corresponding to the check codes 530-*h* or 530-*i*, the memory system may generate up to two different sets of candidate data.

Figures 5D, 5E:
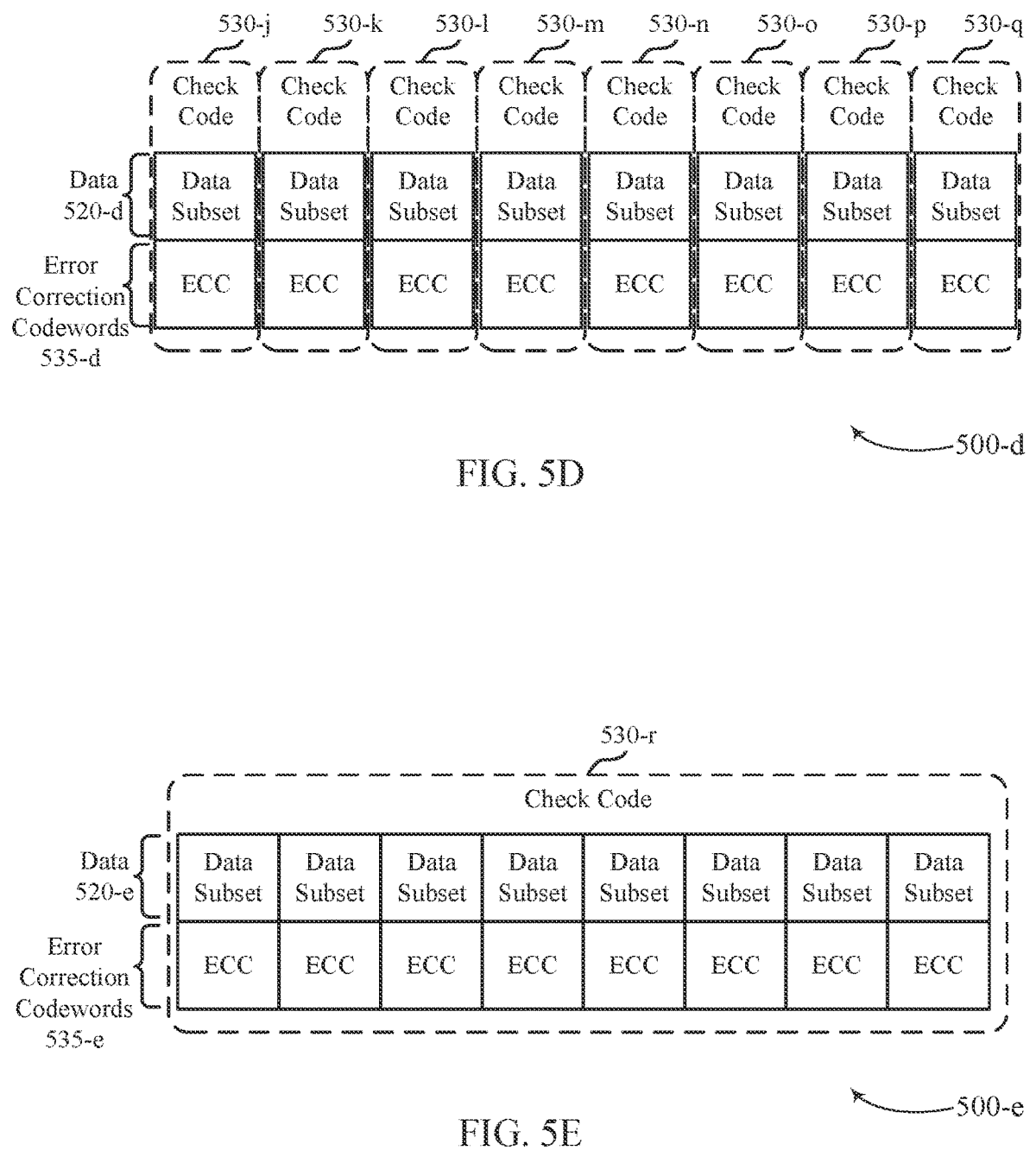

FIG. 5D illustrates an example check code configuration 500-*d*, where each of the check codes 530 (e.g., check codes 530-*j*, 530-*k*, 530-*l*, 530-*m*, 530-*n*, 530-*p*, and 530-*q*) corresponds to a single subset of the data 520-*d*. In some cases, a memory system may detect an error associated with the subsets of data 520-*d* corresponding to one of the check codes 530 in the check code configuration 500-*d*. For example, the memory system may compute eight check values (e.g., from each of the subsets of the data 520-*d*) and compare the computed check values with the corresponding check codes 530. In cases that the computed check value is different than the corresponding check code 530, the memory system may detect an error in the subset of the data 520-*d* corresponding to the check code 530. For example, if the memory system computes a check value from the data subset corresponding to the check code 530-*o* that is different than the check code 530-*o*, the memory system may detect an error in subsets of the data 520-*d* corresponding to the check code 530-*o*. In some cases, to identify and correct errors in one of the subsets of the data 520-*d*, the memory system may generate a single set of candidate data based on the single subset of the data 520-*d* that is associated with the check code 530 that is different than the computed check value.

FIG. 5E illustrates an example check code configuration 500-*e*, where a single check code 530-*r* corresponds to each of the data subsets of the data 520-*e*. In some cases, a memory system may detect an error in one of the subsets of the data 520-*e* in cases that the memory system computes a check value from the data 520-*e* (e.g., including each of the data subsets) that is different than the check code 530-*r*. In some cases, to identify and correct errors in one of the subsets of the data 520-*e*, the memory system may generate up to eight different sets of candidate data corresponding to each of the subsets of the data 520-*e*.

Figure 6:
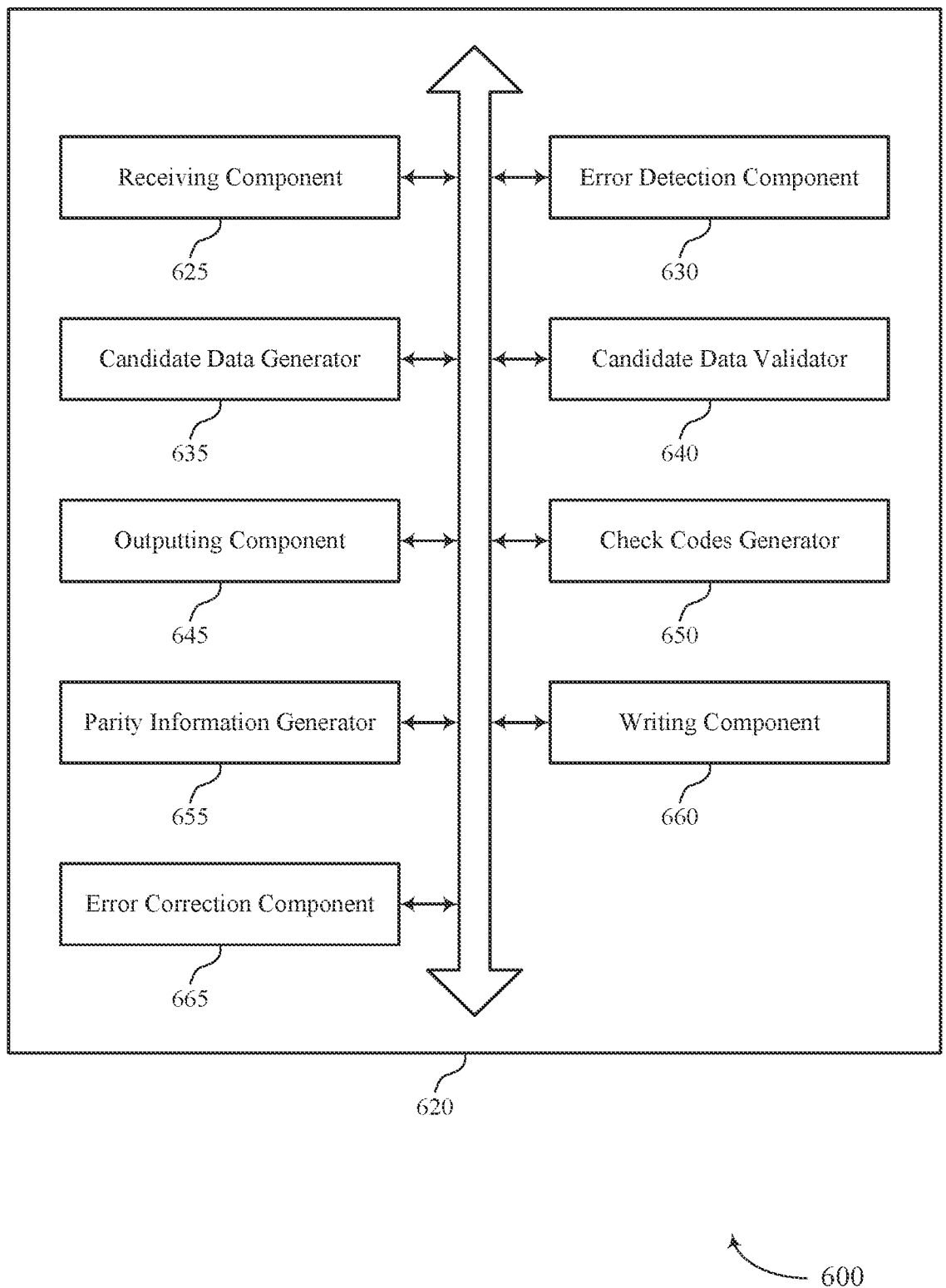
FIG. 6 shows a block diagram of a memory system that supports a data correction scheme with reduced device overhead in accordance with examples as disclosed herein.

FIG. 6 shows a block diagram 600 of a memory system 620 that supports a data correction scheme with reduced device overhead in accordance with examples as disclosed herein. The memory system 620 may be an example of aspects of a memory system as described with reference to FIGS. 1 through 5. The memory system 620, or various components thereof, may be an example of means for performing various aspects of a data correction scheme with reduced device overhead as described herein. For example, the memory system 620 may include a receiving component 625, an error detection component 630, a candidate data generator 635, a candidate data validator 640, an outputting component 645, a check codes generator 650, a parity information generator 655, a writing component 660, an error correction component 665 (e.g., an encoder), or any combination thereof. Each of these components may communicate, directly or indirectly, with one another (e.g., via one or more buses).

The receiving component 625 may be configured as or otherwise support a means for receiving, over a plurality of clock cycles, a set of data and one or more check codes associated with the set of data from a plurality of memory devices and parity information corresponding to the set of data from a single parity device, the set of data including a plurality of subsets of data each received from a respective one memory device of the plurality. The error detection component 630 may be configured as or otherwise support a means for detecting an error associated with first data corresponding to a first check code based at least in part on comparing the first check code to a first check value generated from the first data, the first data including at least a first subset of data from one memory device of the plurality and a second subset of data from another memory device of the plurality. The candidate data generator 635 may be configured as or otherwise support a means for generating, for the first subset of data, candidate data based at least in part on the parity information and remaining subsets of the plurality of subsets of data. The candidate data validator 640 may be configured as or otherwise support a means for determining whether the candidate data is correct based at least in part on comparing a second check value generated from the candidate data and remaining subsets of the plurality of subsets of data in the first data with the first check code. The outputting component 645 may be configured as or otherwise support a means for outputting second data including the remaining subsets of the plurality of subsets of data and the candidate data based at least in part on determining that the candidate data is correct.

In some examples, the error detection component 630 may be configured as or otherwise support a means for comparing, for each clock cycle of the plurality, a subset of the parity information received via one clock cycle of the plurality with a portion of the set of data received via a corresponding one clock cycle of the plurality, where detecting the error associated with the first data is based at least in part on comparing the subset of the parity information with the portion of the set of data for each clock cycle of the plurality.

In some examples, the receiving component 625 may be configured as or otherwise support a means for receiving, during the plurality of clock cycles and from the plurality of memory devices, a plurality of error correction codewords each associated with data from one subset of data of the plurality. In some examples, the error correction component 665 may be configured as or otherwise support a means for performing an error correction operation on the plurality of error correction codewords to obtain the plurality of subsets of data, where comparing the first check code to the first check value is based at least in part on performing the error correction operation on the plurality of error correction codewords.

In some examples, the plurality of error correction codewords include at least one of SEC codewords, or DEC codewords, or a combination thereof. In some examples, the error correction operation includes at least one of a SEC operation, or a DEC operation, or a combination thereof.

In some examples, the candidate data generator 635 may be configured as or otherwise support a means for generating, for the second subset of data, second candidate data based at least in part on the parity information and remaining subsets of the plurality of subsets of data. In some examples, the candidate data validator 640 may be configured as or otherwise support a means for determining whether the second candidate data is correct based at least in part on comparing a third check value generated from the second candidate data and remaining subsets of the plurality of subsets of data in the first data with the first check code, where generating the candidate data is based at least in part on determining that the second candidate data is incorrect.

In some examples, the candidate data generator 635 may be configured as or otherwise support a means for performing an XOR operation on the parity information and the remaining subsets of the plurality of subsets of data, where generating the candidate data is based at least in part on performing the XOR operation.

In some examples, the one or more check codes include a single check code corresponding to data received via each of the plurality of memory devices. In some examples, detecting the error associated with the first data includes detecting the error associated with the set of data based at least in part on comparing the single check code to the first check value generated from the set of data. In some examples, determining whether the candidate data is correct is based at least in part on checking the candidate data and remaining subsets of the plurality of subsets of data in the set of data with the single check code.

In some examples, each of the one or more check codes corresponds to data received from two or more memory devices of the plurality.

In some examples, the one or more check codes include the first check code corresponding to data received via a first quantity of the plurality of memory devices and a second check code corresponding to data received via a second quantity of the plurality of memory devices. In some examples, the first quantity is different than the second quantity.

In some examples, each of the one or more check codes corresponds to data received via two or more memory devices of the plurality that are different than memory devices corresponding to other check codes.

The check codes generator 650 may be configured as or otherwise support a means for generating one or more check codes for a set of data, the set of data to be stored in a plurality of memory devices. The parity information generator 655 may be configured as or otherwise support a means for generating parity information corresponding with the set of data, each bit of the parity information generated from one bit of each of a plurality of subsets of the set of data associated with respective memory devices of the plurality. The writing component 660 may be configured as or otherwise support a means for writing the set of data and the one or more check codes to the plurality of memory devices. In some examples, the writing component 660 may be configured as or otherwise support a means for writing the parity information to a single parity device.

In some examples, the error correction component 665 (e.g., an encoder) may be configured as or otherwise support a means for generating, based at least in part on generating the parity information, a plurality of error correction codewords associated with error correction operations.

In some examples, the error correction component 665 (e.g., an encoder) may be configured as or otherwise support a means for outputting the plurality of error correction codewords to the plurality of memory devices based at least in part on outputting the set of data and the one or more check codes.

In some examples, the plurality of error correction codewords include at least one of SEC codewords, or DEC codewords, or a combination thereof. In some examples, the error correction operations include at least one of a SEC operation, or a DEC operation, or a combination thereof.

In some examples, the check codes generator 650 may be configured as or otherwise support a means for generating a single check code for the set of data, where generating the one or more check codes is based at least in part on generating the single check code.

In some examples, each of the one or more check codes corresponds to data written to two or more memory devices of the plurality.

In some examples, the check codes generator 650 may be configured as or otherwise support a means for generating a first check code for a first quantity of subsets of the plurality of subsets of the set of data and associated with the first quantity of the plurality of memory devices. In some examples, the check codes generator 650 may be configured as or otherwise support a means for generating a second check code for a second quantity of subsets of the plurality of subsets of the set of data and associated with the second quantity of the plurality of memory devices, where the first quantity is different than the second quantity, and where generating the one or more check codes is based at least in part on generating the first check code and the second check code.

In some examples, each of the one or more check codes is for data associated with two or more memory devices of the plurality that are different than memory devices corresponding to other check codes.

In some examples, the parity information generator 655 may be configured as or otherwise support a means for performing, for each bit of the parity information, an XOR operation on one bit of each subset of data of the plurality to generate a corresponding bit of the parity information, where generating the parity information is based at least in part on performing the XOR operation.

Figure 7:
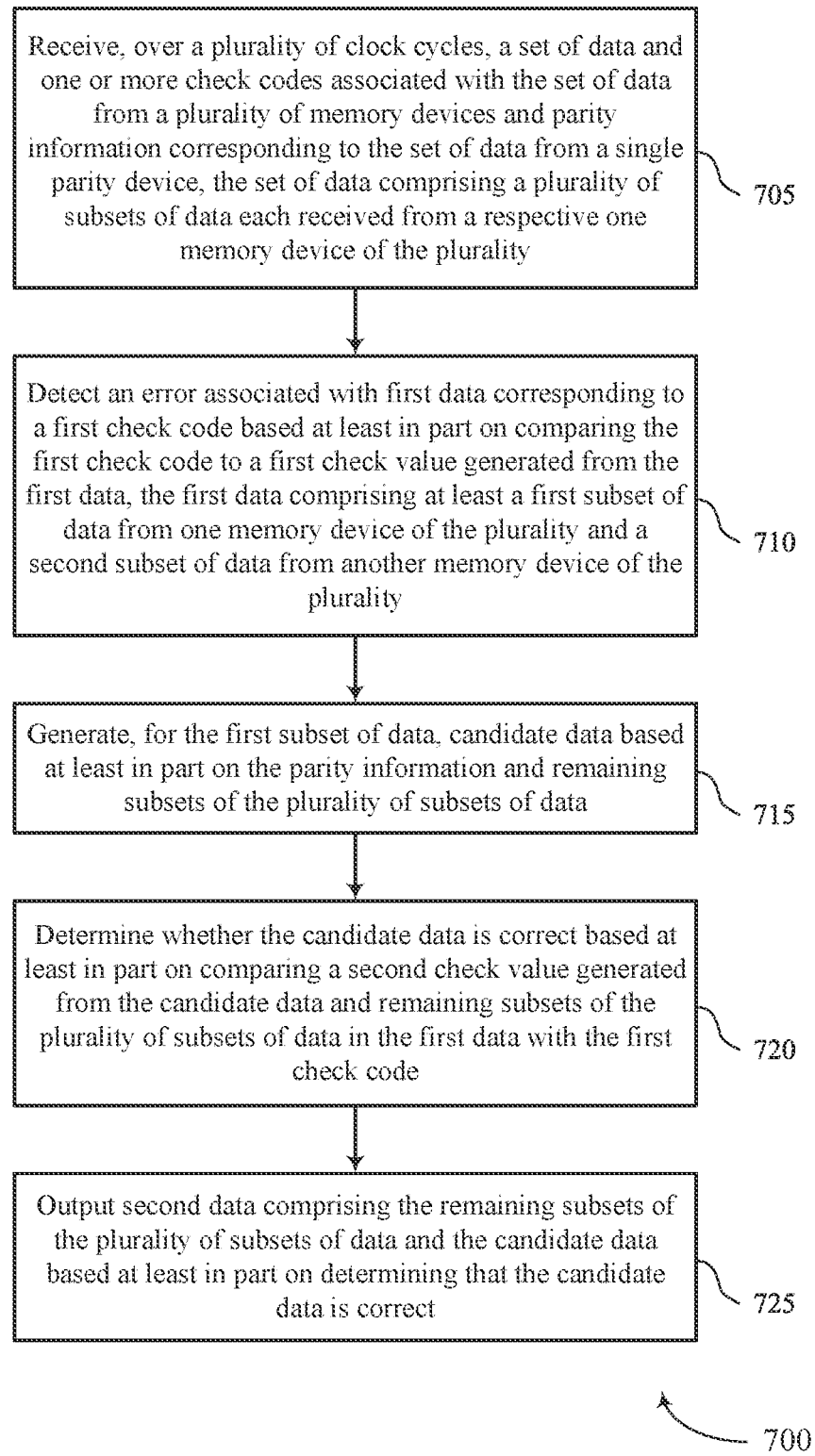
FIGS. 7 and 8 show flowcharts illustrating a method or methods that support a data correction scheme with reduced device overhead in accordance with examples as disclosed herein.

FIG. 7 shows a flowchart illustrating a method 700 that supports a data correction scheme with reduced device overhead in accordance with examples as disclosed herein. The operations of method 700 may be implemented by a memory system or its components as described herein. For example, the operations of method 700 may be performed by a memory system as described with reference to FIGS. 1 through 6. In some examples, a memory system may execute a set of instructions to control the functional elements of the device to perform the described functions. Additionally, or alternatively, the memory system may perform aspects of the described functions using special-purpose hardware.

At 705, the method may include receiving, over a plurality of clock cycles, a set of data and one or more check codes associated with the set of data from a plurality of memory devices and parity information corresponding to the set of data from a single parity device, the set of data including a plurality of subsets of data each received from a respective one memory device of the plurality. The operations of 705 may be performed in accordance with examples as disclosed with reference to FIGS. 3 through 5E. In some examples, aspects of the operations of 705 may be performed by a receiving component 625 as described with reference to FIG. 6.

At 710, the method may include detecting an error associated with first data corresponding to a first check code based at least in part on comparing the first check code to a first check value generated from the first data, the first data including at least a first subset of data from one memory device of the plurality and a second subset of data from another memory device of the plurality. The operations of 710 may be performed in accordance with examples as disclosed with reference to FIGS. 3 through 5E. In some examples, aspects of the operations of 710 may be performed by an error detection component 630 as described with reference to FIG. 6.

At 715, the method may include generating, for the first subset of data, candidate data based at least in part on the parity information and remaining subsets of the plurality of subsets of data. The operations of 715 may be performed in accordance with examples as disclosed with reference to FIGS. 3 through 5E. In some examples, aspects of the operations of 715 may be performed by a candidate data generator 635 as described with reference to FIG. 6.

At 720, the method may include determining whether the candidate data is correct based at least in part on comparing a second check value generated from the candidate data and remaining subsets of the plurality of subsets of data in the first data with the first check code. The operations of 720 may be performed in accordance with examples as disclosed with reference to FIGS. 3 through 5E. In some examples, aspects of the operations of 720 may be performed by a candidate data validator 640 as described with reference to FIG. 6.

At 725, the method may include outputting second data including the remaining subsets of the plurality of subsets of data and the candidate data based at least in part on determining that the candidate data is correct. The operations of 725 may be performed in accordance with examples as disclosed with reference to FIGS. 3 through 5E. In some examples, aspects of the operations of 725 may be performed by an outputting component 645 as described with reference to FIG. 6.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, over a plurality of clock cycles, a set of data and one or more check codes associated with the set of data from a plurality of memory devices and parity information corresponding to the set of data from a single parity device, the set of data including a plurality of subsets of data each received from a respective one memory device of the plurality; detecting an error associated with first data corresponding to a first check code based at least in part on comparing the first check code to a first check value generated from the first data, the first data including at least a first subset of data from one memory device of the plurality and a second subset of data from another memory device of the plurality; generating, for the first subset of data, candidate data based at least in part on the parity information and remaining subsets of the plurality of subsets of data; determining whether the candidate data is correct based at least in part on comparing a second check value generated from the candidate data and remaining subsets of the plurality of subsets of data in the first data with the first check code; and outputting second data including the remaining subsets of the plurality of subsets of data and the candidate data based at least in part on determining that the candidate data is correct.

Aspect 2: The method, apparatus, or non-transitory computer-readable medium of aspect 1, further including operations, features, circuitry, logic, means, or instructions, or any combination thereof for comparing, for each clock cycle of the plurality, a subset of the parity information received via one clock cycle of the plurality with a portion of the set of data received via a corresponding one clock cycle of the plurality, where detecting the error associated with the first data is based at least in part on comparing the subset of the parity information with the portion of the set of data for each clock cycle of the plurality.

Aspect 3: The method, apparatus, or non-transitory computer-readable medium of any of aspects 1 through 2, further including operations, features, circuitry, logic, means, or instructions, or any combination thereof for receiving, during the plurality of clock cycles and from the plurality of memory devices, a plurality of error correction codewords each associated with data from one subset of data of the plurality and performing an error correction operation on the plurality of error correction codewords to obtain the plurality of subsets of data, where comparing the first check code to the first check value is based at least in part on performing the error correction operation on the plurality of error correction codewords.

Aspect 4: The method, apparatus, or non-transitory computer-readable medium of aspect 3 where the plurality of error correction codewords include at least one of SEC codewords, or DEC codewords, or a combination thereof and the error correction operation includes at least one of a SEC operation, or a DEC operation, or a combination thereof.

Aspect 5: The method, apparatus, or non-transitory computer-readable medium of any of aspects 1 through 4, further including operations, features, circuitry, logic, means, or instructions, or any combination thereof for generating, for the second subset of data, second candidate data based at least in part on the parity information and remaining subsets of the plurality of subsets of data and determining whether the second candidate data is correct based at least in part on comparing a third check value generated from the second candidate data and remaining subsets of the plurality of subsets of data in the first data with the first check code, where generating the candidate data is based at least in part on determining that the second candidate data is incorrect.

Aspect 6: The method, apparatus, or non-transitory computer-readable medium of any of aspects 1 through 5, further including operations, features, circuitry, logic, means, or instructions, or any combination thereof for performing an XOR operation on the parity information and the remaining subsets of the plurality of subsets of data, where generating the candidate data is based at least in part on performing the XOR operation.

Aspect 7: The method, apparatus, or non-transitory computer-readable medium of any of aspects 1 through 6 where the one or more check codes include a single check code corresponding to data received via each of the plurality of memory devices; detecting the error associated with the first data includes detecting the error associated with the set of data based at least in part on comparing the single check code to the first check value generated from the set of data; and determining whether the candidate data is correct is based at least in part on checking the candidate data and remaining subsets of the plurality of subsets of data in the set of data with the single check code.

Aspect 8: The method, apparatus, or non-transitory computer-readable medium of any of aspects 1 through 7 where each of the one or more check codes corresponds to data received from two or more memory devices of the plurality.

Aspect 9: The method, apparatus, or non-transitory computer-readable medium of any of aspects 1 through 8 where the one or more check codes include the first check code corresponding to data received via a first quantity of the plurality of memory devices and a second check code corresponding to data received via a second quantity of the plurality of memory devices and the first quantity is different than the second quantity.

Aspect 10: The method, apparatus, or non-transitory computer-readable medium of any of aspects 1 through 9 where each of the one or more check codes corresponds to data received via two or more memory devices of the plurality that are different than memory devices corresponding to other check codes.

Figure 8:
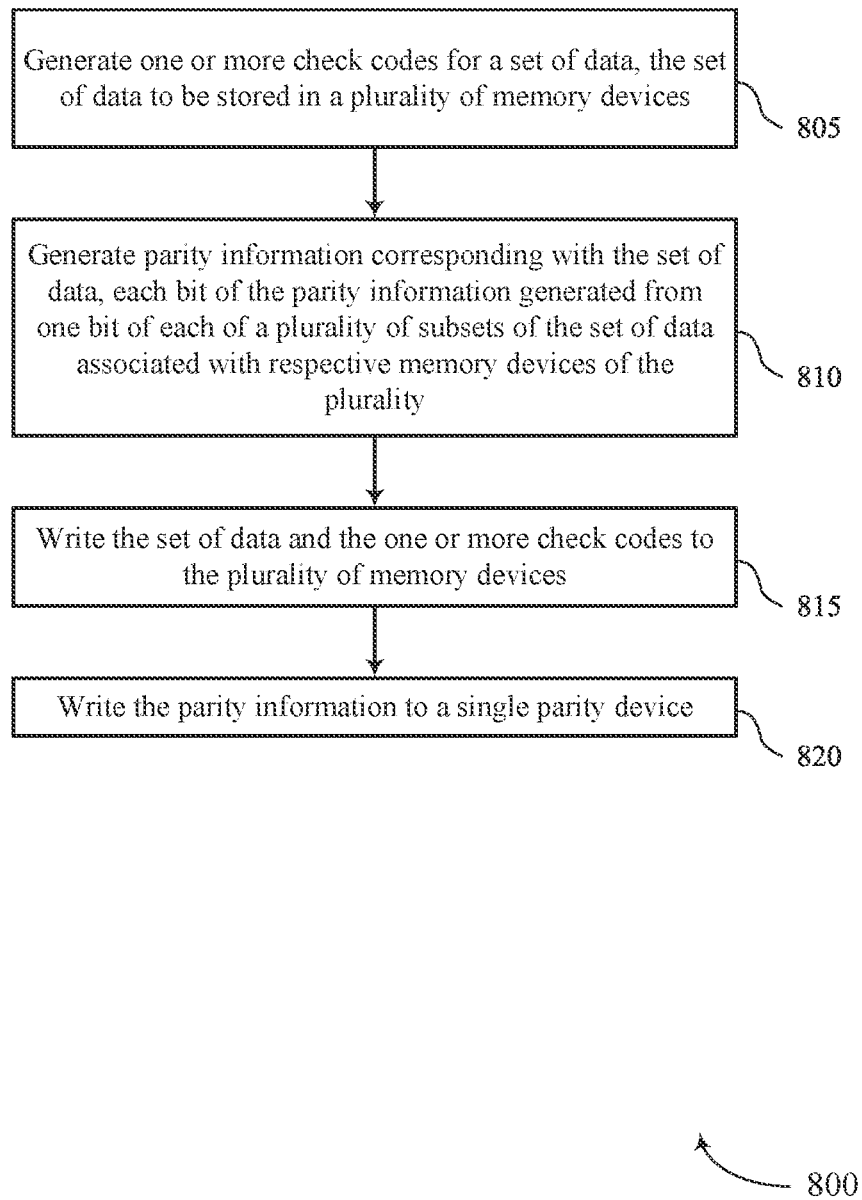

FIG. 8 shows a flowchart illustrating a method 800 that supports a data correction scheme with reduced device overhead in accordance with examples as disclosed herein. The operations of method 800 may be implemented by a memory system or its components as described herein. For example, the operations of method 800 may be performed by a memory system as described with reference to FIGS. 1 through 6. In some examples, a memory system may execute a set of instructions to control the functional elements of the device to perform the described functions. Additionally, or alternatively, the memory system may perform aspects of the described functions using special-purpose hardware.

At 805, the method may include generating one or more check codes for a set of data, the set of data to be stored in a plurality of memory devices. The operations of 805 may be performed in accordance with examples as disclosed with reference to FIGS. 2 and 5A through 5E. In some examples, aspects of the operations of 805 may be performed by a check codes generator 650 as described with reference to FIG. 6.

At 810, the method may include generating parity information corresponding with the set of data, each bit of the parity information generated from one bit of each of a plurality of subsets of the set of data associated with respective memory devices of the plurality. The operations of 810 may be performed in accordance with examples as disclosed with reference to FIGS. 2 and 5A through 5E. In some examples, aspects of the operations of 810 may be performed by a parity information generator 655 as described with reference to FIG. 6.

At 815, the method may include writing the set of data and the one or more check codes to the plurality of memory devices. The operations of 815 may be performed in accordance with examples as disclosed with reference to FIGS. 2 and 5A through 5E. In some examples, aspects of the operations of 815 may be performed by a writing component 660 as described with reference to FIG. 6.

At 820, the method may include writing the parity information to a single parity device. The operations of 820 may be performed in accordance with examples as disclosed with reference to FIGS. 2 and 5A through 5E. In some examples, aspects of the operations of 820 may be performed by a writing component 660 as described with reference to FIG. 6.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 11: A method, apparatus, or non-transitory computer-readable medium including operations, features, circuitry, logic, means, or instructions, or any combination thereof for generating one or more check codes for a set of data, the set of data to be stored in a plurality of memory devices; generating parity information corresponding with the set of data, each bit of the parity information generated from one bit of each of a plurality of subsets of the set of data associated with respective memory devices of the plurality; writing the set of data and the one or more check codes to the plurality of memory devices; and writing the parity information to a single parity device.

Aspect 12: The method, apparatus, or non-transitory computer-readable medium of aspect 11, further including operations, features, circuitry, logic, means, or instructions, or any combination thereof for generating, based at least in part on generating the parity information, a plurality of error correction codewords associated with error correction operations.

Aspect 13: The method, apparatus, or non-transitory computer-readable medium of aspect 12, further including operations, features, circuitry, logic, means, or instructions, or any combination thereof for outputting the plurality of error correction codewords to the plurality of memory devices based at least in part on outputting the set of data and the one or more check codes.

Aspect 14: The method, apparatus, or non-transitory computer-readable medium of any of aspects 12 through 13 where the plurality of error correction codewords include at least one of SEC codewords, or DEC codewords, or a combination thereof and the error correction operations include at least one of a SEC operation, or a DEC operation, or a combination thereof.

Aspect 15: The method, apparatus, or non-transitory computer-readable medium of any of aspects 11 through 14, further including operations, features, circuitry, logic, means, or instructions, or any combination thereof for generating a single check code for the set of data, where generating the one or more check codes is based at least in part on generating the single check code.

Aspect 16: The method, apparatus, or non-transitory computer-readable medium of any of aspects 11 through 15 where each of the one or more check codes corresponds to data written to two or more memory devices of the plurality.

Aspect 17: The method, apparatus, or non-transitory computer-readable medium of any of aspects 11 through 16, further including operations, features, circuitry, logic, means, or instructions, or any combination thereof for generating a first check code for a first quantity of subsets of the plurality of subsets of the set of data and associated with the first quantity of the plurality of memory devices and generating a second check code for a second quantity of subsets of the plurality of subsets of the set of data and associated with the second quantity of the plurality of memory devices, where the first quantity is different than the second quantity, and where generating the one or more check codes is based at least in part on generating the first check code and the second check code.

Aspect 18: The method, apparatus, or non-transitory computer-readable medium of any of aspects 11 through 17 where each of the one or more check codes is for data associated with two or more memory devices of the plurality that are different than memory devices corresponding to other check codes.

Aspect 19: The method, apparatus, or non-transitory computer-readable medium of any of aspects 11 through 18, further including operations, features, circuitry, logic, means, or instructions, or any combination thereof for performing, for each bit of the parity information, an XOR operation on one bit of each subset of data of the plurality to generate a corresponding bit of the parity information, where generating the parity information is based at least in part on performing the XOR operation.

It should be noted that the methods described herein describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:
   a plurality of memory devices that each comprise capacitive storage elements;
   a single parity device that comprises capacitive storage elements; and
   one or more controllers coupled with the plurality of memory devices and the single parity device and configured to cause the apparatus to:
   receive, over a plurality of clock cycles, a set of data and one or more check codes associated with the set of data from the plurality of memory devices and parity information corresponding to the set of data from the single parity device, the set of data comprising a plurality of subsets of data each received from a respective one memory device of the plurality;
   detect an error associated with first data corresponding to a first check code based at least in part on a comparison of the first check code to a first check value generated from the first data, the first data comprising at least a first subset of data from one memory device of the plurality and a second subset of data from another memory device of the plurality;
   generate, for the first subset of data, candidate data based at least in part on the parity information and remaining subsets of the plurality of subsets of data;
   determine whether the candidate data is correct based at least in part on comparing a second check value generated from the candidate data and remaining subsets of the plurality of subsets of data in the first data with the first check code; and
   output second data comprising the remaining subsets of the plurality of subsets of data and the candidate data based at least in part on a determination that the candidate data is correct.

2. The apparatus of claim 1, wherein the one or more controllers are further configured to cause the apparatus to:

compare, for each clock cycle of the plurality, a subset of the parity information received via one clock cycle of the plurality with a portion of the set of data received via a corresponding one clock cycle of the plurality, wherein the detection of the error associated with the first data is based at least in part on the comparison of the subset of the parity information with the portion of the set of data for each clock cycle of the plurality.

3. The apparatus of claim 1, wherein the one or more controllers are further configured to cause the apparatus to:
receive, during the plurality of clock cycles and from the plurality of memory devices, a plurality of error correction codewords each associated with data from one subset of data of the plurality; and
perform an error correction operation on the plurality of error correction codewords to obtain the plurality of subsets of data, wherein comparing the first check code to the first check value is based at least in part on performing the error correction operation on the plurality of error correction codewords.

4. The apparatus of claim 3, wherein:
the plurality of error correction codewords comprise at least one of single error correction (SEC) codewords, or double error correction (DEC) codewords, or a combination thereof; and
the error correction operation comprises at least one of a SEC operation, or a DEC operation, or a combination thereof.

5. The apparatus of claim 1, wherein the one or more controllers are further configured to cause the apparatus to:
generate, for the second subset of data, second candidate data based at least in part on the parity information and remaining subsets of the plurality of subsets of data; and
determine whether the second candidate data is correct based at least in part on comparing a third check value generated from the second candidate data and remaining subsets of the plurality of subsets of data in the first data with the first check code, wherein generating the candidate data is based at least in part on determining that the second candidate data is incorrect.

6. The apparatus of claim 1, wherein the one or more controllers are further configured to cause the apparatus to:
perform an exclusive or (XOR) operation on the parity information and the remaining subsets of the plurality of subsets of data, wherein generating the candidate data is based at least in part on performing the XOR operation.

7. The apparatus of claim 1, wherein:
the one or more check codes comprise a single check code corresponding to data received via each of the plurality of memory devices;
the detection of the error associated with the first data comprises detection of the error associated with the set of data based at least in part on a comparison of the single check code to the first check value generated from the set of data; and
the determination that the candidate data is correct is based at least in part on a check of the candidate data and remaining subsets of the plurality of subsets of data in the set of data with the single check code.

8. The apparatus of claim 1, wherein each of the one or more check codes corresponds to data received from two or more memory devices of the plurality.

9. The apparatus of claim 1, wherein:
the one or more check codes comprise the first check code corresponding to data received via a first quantity of the plurality of memory devices and a second check code corresponding to data received via a second quantity of the plurality of memory devices; and
the first quantity is different than the second quantity.

10. The apparatus of claim 1, wherein each of the one or more check codes corresponds to data received via two or more memory devices of the plurality that are different than memory devices corresponding to other check codes.

11. A method, comprising:
receiving, over a plurality of clock cycles, a set of data and one or more check codes associated with the set of data from a plurality of memory devices and parity information corresponding to the set of data from a single parity device, the set of data comprising a plurality of subsets of data each received from a respective one memory device of the plurality;
detecting an error associated with first data corresponding to a first check code based at least in part on comparing the first check code to a first check value generated from the first data, the first data comprising at least a first subset of data from one memory device of the plurality and a second subset of data from another memory device of the plurality;
generating, for the first subset of data, candidate data based at least in part on the parity information and remaining subsets of the plurality of subsets of data;
determining whether the candidate data is correct based at least in part on comparing a second check value generated from the candidate data and remaining subsets of the plurality of subsets of data in the first data with the first check code; and
outputting second data comprising the remaining subsets of the plurality of subsets of data and the candidate data based at least in part on determining that the candidate data is correct.

12. The method of claim 11, further comprising:
comparing, for each clock cycle of the plurality, a subset of the parity information received via one clock cycle of the plurality with a portion of the set of data received via a corresponding one clock cycle of the plurality, wherein detecting the error associated with the first data is based at least in part on comparing the subset of the parity information with the portion of the set of data for each clock cycle of the plurality.

13. The method of claim 11, further comprising:
receiving, during the plurality of clock cycles and from the plurality of memory devices, a plurality of error correction codewords each associated with data from one subset of data of the plurality; and
performing an error correction operation on the plurality of error correction codewords to obtain the plurality of subsets of data, wherein comparing the first check code to the first check value is based at least in part on performing the error correction operation on the plurality of error correction codewords.

14. The method of claim 13, wherein:
the plurality of error correction codewords comprise at least one of single error correction (SEC) codewords, or double error correction (DEC) codewords, or a combination thereof; and
the error correction operation comprises at least one of a SEC operation, or a DEC operation, or a combination thereof.

15. The method of claim 11, further comprising:
generating, for the second subset of data, second candidate data based at least in part on the parity information and remaining subsets of the plurality of subsets of data; and
determining whether the second candidate data is correct based at least in part on comparing a third check value generated from the second candidate data and remaining subsets of the plurality of subsets of data in the first data with the first check code, wherein generating the candidate data is based at least in part on determining that the second candidate data is incorrect.

16. The method of claim 11, further comprising:
performing an exclusive or (XOR) operation on the parity information and the remaining subsets of the plurality of subsets of data, wherein generating the candidate data is based at least in part on performing the XOR operation.

17. The method of claim 11, wherein:
the one or more check codes comprise a single check code corresponding to data received via each of the plurality of memory devices;
detecting the error associated with the first data comprises detecting the error associated with the set of data based at least in part on comparing the single check code to the first check value generated from the set of data; and
determining whether the candidate data is correct is based at least in part on checking the candidate data and remaining subsets of the plurality of subsets of data in the set of data with the single check code.

18. The method of claim 11, wherein each of the one or more check codes corresponds to data received from two or more memory devices of the plurality.

19. The method of claim 11, wherein:
the one or more check codes comprise the first check code corresponding to data received via a first quantity of the plurality of memory devices and a second check code corresponding to data received via a second quantity of the plurality of memory devices; and
the first quantity is different than the second quantity.

20. The method of claim 11, wherein each of the one or more check codes corresponds to data received via two or more memory devices of the plurality that are different than memory devices corresponding to other check codes.

* * * * *